(12) United States Patent
Finkeldei et al.

(10) Patent No.: US 9,927,120 B2
(45) Date of Patent: Mar. 27, 2018

(54) METHOD FOR THERMALLY AFTER-BURNING WASTE GASES FROM ACROLEIN AND HYDROCYANIC ACID PRODUCTION

(75) Inventors: Caspar Heinrich Finkeldei, Alzenau (DE); Pablo Zacchi, Hürth (DE); Martin Körfer, Kahl (DE)

(73) Assignee: Evonik Degussa GmbH, Essen (DE)

( * ) Notice: Subject to any disclaimer, the term of this patent is extended or adjusted under 35 U.S.C. 154(b) by 679 days.

(21) Appl. No.: 13/996,585

(22) PCT Filed: Dec. 19, 2011

(86) PCT No.: PCT/EP2011/073169
§ 371 (c)(1),
(2), (4) Date: Jun. 21, 2013

(87) PCT Pub. No.: WO2012/084767
PCT Pub. Date: Jun. 28, 2012

(65) Prior Publication Data
US 2013/0295509 A1    Nov. 7, 2013

(30) Foreign Application Priority Data
Dec. 22, 2010 (EP) .................................... 10196596

(51) Int. Cl.
B01D 53/56    (2006.01)
F23G 7/06    (2006.01)
B01D 53/00    (2006.01)

(52) U.S. Cl.
CPC ............. *F23G 7/06* (2013.01); *B01D 53/005* (2013.01); *F23G 7/065* (2013.01);
(Continued)

(58) Field of Classification Search
None
See application file for complete search history.

(56) References Cited

U.S. PATENT DOCUMENTS 5,817,909 A    10/1998 Lescuyer et al.
5,925,794 A *   7/1999 Hsu ....................... C07C 319/18
                                                          568/41
(Continued)

FOREIGN PATENT DOCUMENTS

DE    2301445 A1    7/1974
DE    19624674 A1   1/1998
(Continued)

OTHER PUBLICATIONS

International Search Report for PCT/EP2011/073169 dated Feb. 23, 2012.

*Primary Examiner* — Anita Nassiri Motlagh
(74) *Attorney, Agent, or Firm* — Reed Smith LLP; Ryan P. Cox

(57) ABSTRACT

The invention relates to a method for thermally after-burning the waste gas flows developing during the production of acrolein in a gas phase process and for thermally after-burning the waste gas flows developing during the production of hydrocyanic acid in a gas phase process, characterized in that the waste gas flows from the production of acrolein and the waste gas flows from the production of hydrocyanic acid are supplied to a joint thermal after-burning process.

4 Claims, 3 Drawing Sheets

(52) U.S. Cl.
CPC .. *B01D 2257/108* (2013.01); *B01D 2257/408* (2013.01); *B01D 2257/502* (2013.01); *B01D 2257/70* (2013.01)

(56) References Cited

U.S. PATENT DOCUMENTS

| | | | |
|---|---|---|---|
| 6,348,638 B1 | 2/2002 | Schliephake et al. | |
| 2004/0093860 A1 | 5/2004 | DeCourcy et al. | |
| 2010/0047879 A1* | 2/2010 | Figge | C12P 13/12 435/113 |
| 2010/0316552 A1* | 12/2010 | Boehling | B01J 19/0093 423/373 |

FOREIGN PATENT DOCUMENTS

| | | |
|---|---|---|
| DE | 19801761 A1 | 1/1999 |
| EP | 0598639 A1 | 5/1994 |
| EP | 1422476 A2 | 5/2004 |
| WO | WO-2006082224 A1 | 8/2006 |

* cited by examiner

METHOD FOR THERMALLY AFTER-BURNING WASTE GASES FROM ACROLEIN AND HYDROCYANIC ACID PRODUCTION

RELATED APPLICATIONS

This application is a national stage application (under 35 U.S.C. § 371) of PCT/EP2011/073169, filed Dec. 19, 2011, which claims benefit of European application 10196596.0, filed Dec. 22, 2010.

The invention relates to a process for the thermal afterburning of the exhaust gas streams that are formed in the production of acrolein in a gas-phase process, and the thermal afterburning of the exhaust gas streams that are formed in the production of prussic acid in a gas-phase process.

Thermal afterburning is taken by a person skilled in the art to mean the oxidation in a combustion operation of the combustible substances present in process exhaust air or a process exhaust gas, wherein an additional fuel can be used for the combustion operation. The consumption of additional fuel, for example natural gas or petroleum, depends on the concentration of the combustible substances in the process exhaust air or the process exhaust gas. The thermal afterburning typically proceeds at temperatures of 800° C.-1200° C. and at a residence time of about 1-4 s.

The precursors in the production of methionine or methionine hydroxy analogue (MHA), in addition to methylmercaptan (methanethiol), also include acrolein (propenal) and prussic acid (hydrogen cyanide).

Acrolein is produced for this purpose currently virtually without exception in a gas-phase process using a propylene, air and steam mixture. The resultant acrolein-containing vapours are converted in an additional process, for example by absorption, into the liquid phase. In this case a large exhaust gas stream occurs which must be disposed of. This disposal generally proceeds via thermal afterburning [described, e.g., in: Acrolein, 1975, Dr. Alfred Hüthig Verlag GmbH, Heidelberg].

In the synthesis of acrolein, in addition, a wastewater stream is further produced, which contains the by-products and condensate formed in the synthesis. This wastewater stream can either be biodegraded or likewise fed to the thermal afterburning.

Acrolein production is shown schematically in FIG. 1.

With respect to the exhaust gas disposal, it is irrelevant here whether the additional process is a classical absorber-desorber unit in which acrolein is isolated, or whether it is a reactive absorber in which acrolein can be converted directly into the next intermediate methylmercaptopropionaldehyde [3-(methylthio)propanal].

Typically, the wastewater and exhaust gas stream arising in the acrolein production contains the following components:

TABLE 1

Composition of the exhaust gas and the wastewater from acrolein synthesis
Composition [% by weight]

|  | AC wastewater (optional) | AC exhaust gas |
|---|---|---|
| $O_2$ | 0.0 | 6.2 |
| $N_2$ | 0.0 | 90.0 |
| CO | 0.0 | 0.6 |
| $CO_2$ | 0.0 | 2.2 |

TABLE 1-continued

Composition of the exhaust gas and the wastewater from acrolein synthesis
Composition [% by weight]

|  | AC wastewater (optional) | AC exhaust gas |
|---|---|---|
| $H_2O$ | 80.8 | 0.5 |
| Combustible residue (e.g. propene, acrolein, acrylic acid) | 19.2 | 0.4 |

For the thermal afterburning of 1 $Nm^3$ of the exhaust gas stream stated under Table 1, about 1 $Nm^3$ of air and 0.07 $Nm^3$ of natural gas are required. The resultant heat can be utilized for steam production.

A disadvantage of the thermal afterburning of the exhaust gas stream arising in the production of acrolein is, firstly, the consumption of auxiliary fuel in the form of natural gas or, alternatively, petroleum, and the required amount of air. Air comprises approximately 78% nitrogen, wherein nitrogen does not have a calorific value. For the thermal afterburning of the exhaust gas stream arising in the production of acrolein, large amounts of nitrogen are introduced which must be warmed and therefore are a loss of heat which is no longer completely available for steam production.

As mentioned at the outset, the precursors of methionine production also include prussic acid. Prussic acid can be obtained from case to case as a by-product from other processes, e.g. from the production of acrylonitrile. Frequently, however, prussic acid is also produced in a targeted manner as a precursor for methionine or methionine hydroxy analogue.

Prussic acid is again produced in gas-phase processes, for example by the Andrussow process, in which, likewise, a large exhaust gas stream that must be disposed of is produced. Here also, the disposal generally proceeds via thermal afterburning [Chemie Ingenieur Technik (1970), 42(2), 63-72].

Prussic acid production is shown schematically in FIG. 2.

With respect to the exhaust gas disposal, it is irrelevant, in turn, whether the additional process is a classical absorber-desorber unit, in which prussic acid is isolated, or whether it is a reactive absorber in which prussic acid can be converted directly into the next intermediate methylmercaptopropionaldehyde cyanohydrin [2-hydroxy-4-(methylthio)butanenitrile].

Typically, the exhaust gas stream arising in the prussic acid production contains the following components:

TABLE 2

Composition of the exhaust gas from prussic acid production
Composition [% by weight]

|  | HCN exhaust gas |
|---|---|
| $O_2$ | 0.5 |
| $N_2$ | 89.1 |
| CO | 7.0 |
| $CO_2$ | 0.6 |
| $H_2O$ | 0.6 |
| Burnable residue (e.g. methane, prussic acid, hydrogen) | 2.1 |

For the thermal afterburning of 1 $Nm^3$ of the exhaust gas stream stated under Table 2, approximately 0.9 $Nm^3$/h of air are required. Owing to the relatively high proportion of thermally utilizable substances in the exhaust gas stream such as, e.g., methane or hydrogen, an additional feed of natural gas for the thermal afterburning of the exhaust gas from prussic acid production, apart from what is termed a pilot flame, is not necessary. The heat produced in the thermal afterburning can likewise be utilized for steam production.

Although the thermal afterburning of the exhaust gas stream arising in the production of prussic acid does not require an additional fuel (apart from the pilot flame), the required amount of air is disadvantageous. Air comprises approximately 78% nitrogen, wherein nitrogen does not have a calorific value. For the thermal afterburning of the exhaust gas stream arising in the production of prussic acid, large amounts of nitrogen are introduced which must be heated and therefore are a heat loss for steam production.

Furthermore, the exhaust gas volumetric streams from acrolein production and prussic acid production are each relatively large and are therefore expensive in disposal.

It is therefore the object of the present invention to provide a process for the thermal afterburning of exhaust gases from the production of acrolein and prussic acid, in which process the disadvantages of the prior art are at least decreased.

Figure 1:
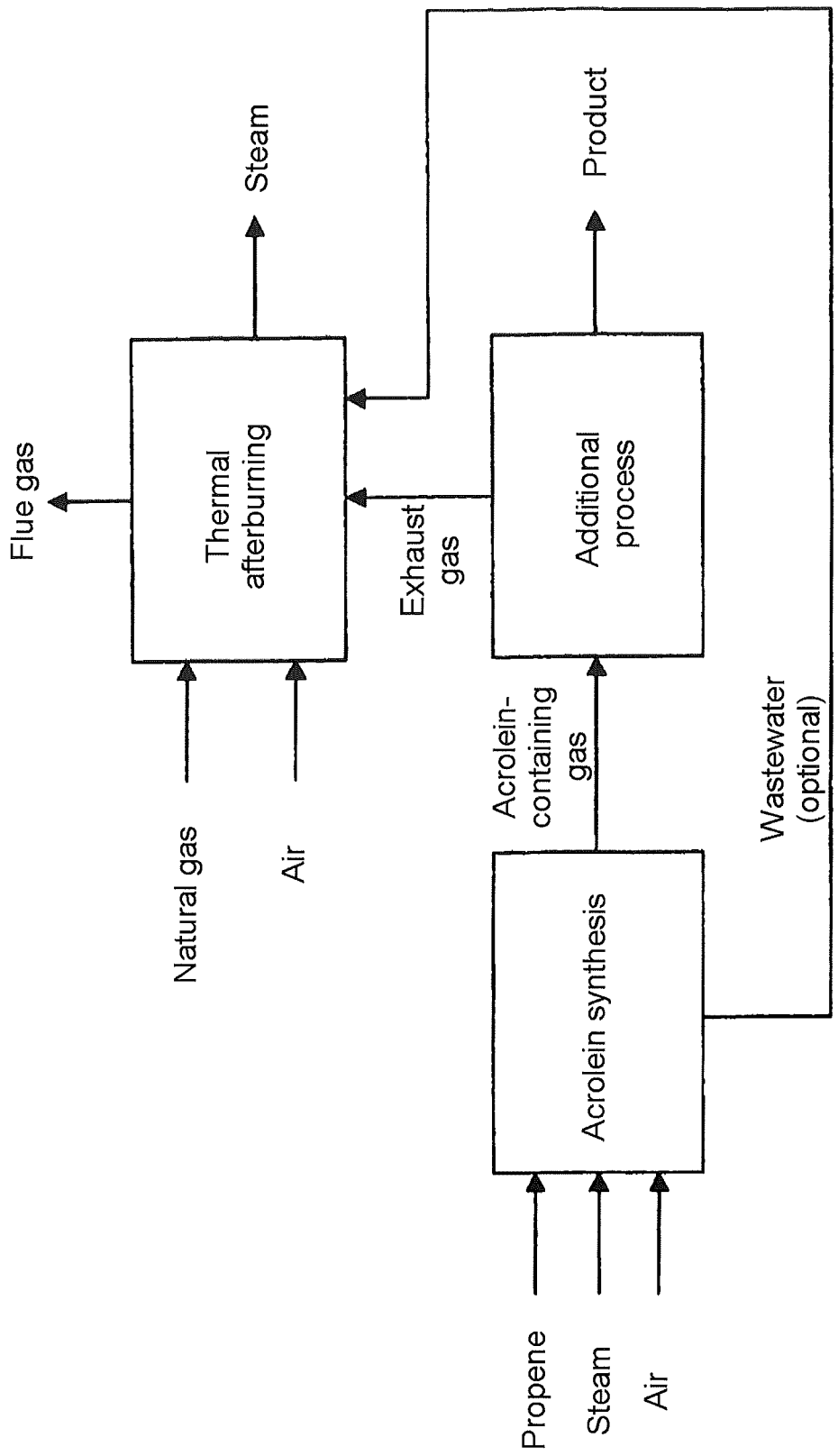
FIG. 1 illustrates a process for production of acrolein.
Figure 2:
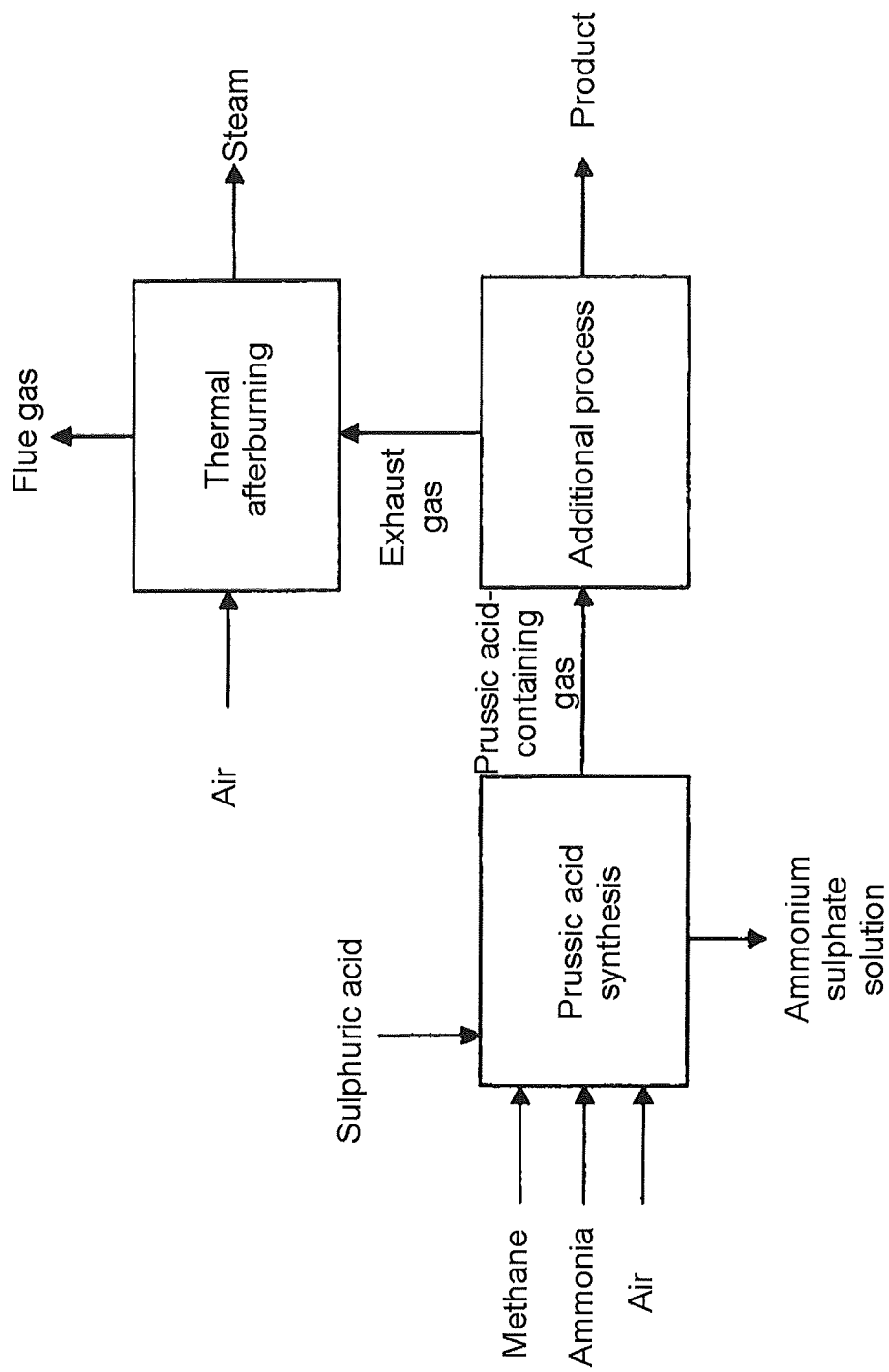
FIG. 2 illustrates a process for the production of prussic acid.

This object is achieved by a process for the thermal afterburning of the exhaust gas streams that are formed in the production of acrolein in a gas-phase process, and the thermal afterburning of the exhaust gas streams that are formed in the production of prussic acid in a gas-phase process, characterized in that the exhaust gas streams from the production of acrolein and the exhaust gas streams from the production of prussic acid are fed to a shared thermal afterburning.

The exhaust gas streams are therefore not disposed of separately in separate processes, but both exhaust gas streams are treated in a single thermal afterburning. The thermal afterburning of the exhaust gas streams from the production of acrolein and from the production of prussic acid also does not proceed successively with respect to time, but at least partially in parallel with respect to time, i.e. concurrently with respect to time.

Preferably, the exhaust gas streams are fed to the thermal afterburning with the greatest possible overlapping in time. For this purpose, the exhaust gas streams from the production of acrolein and the exhaust gas streams from the production of prussic acid can first be combined and fed together to the thermal afterburning, or each exhaust gas stream can be fed separately in parallel, assuming that this does not proceed sequentially in time, but at least partially parallel in time, i.e. concurrently with respect to time.

In a preferred embodiment of the process according to the present invention, not only the exhaust gas stream arising in the acrolein production, but also the resultant wastewater stream is fed to the thermal afterburning. As a result, a biological treatment stage for the resultant wastewater can be dispensed with.

A shared combustion plant for both process exhaust gases, owing to upscaling effects, would already offer the customary savings on capital expenditure for such a plant, since two combustion plants do not need to be built, but only one individual combustion plant dimensioned to be correspondingly larger therefor.

However, completely surprisingly, it has been found that a shared thermal afterburning is associated with further substantial advantages.

The shared thermal afterburning makes possible a lower introduction of air. As a result smaller amounts of nitrogen which do not have a calorific value are introduced. Less nitrogen from the air needs to be heated, which leads to a lower heat loss. Therefore, the steam production, based on the additional fuel used, increases.

The reason for the savings in combustion air is in the composition of the two exhaust gas streams. The exhaust gas stream from the production of acrolein has a relatively low calorific value, but still contains significant concentrations of residual oxygen (see Table 1). The exhaust gas stream from the production of prussic acid contains excess calorific value, but virtually no more oxygen (see Table 2). Some of the oxygen required for the combustion of the exhaust gas from the production of prussic acid can be provided via the shared thermal afterburning by the exhaust gas stream from the production of acrolein. Since less combustion air is required, in the shared thermal afterburning, a smaller combustion chamber volume can also be used, than would be possible in the case of a simple design without synergistic effects.

A further advantage of the process according to the invention is the saving of additional fuel. Since the exhaust gas stream from the production of prussic acid contains excess calorific value, the exhaust gas stream from the production of prussic acid replaces at least in part the feed of additional fuel.

Preferably, the process according to the invention is distinguished in that the exhaust gas streams arising in the production of prussic acid in a gas-phase process are exhaust gas streams from the Andrussow process. The Andrussow process is known to those skilled in the art and is described by way of example in Ullmann's Encyclopedia of Industrial Chemistry, sixth Edition, Volume 10, page 194. In a further preferred embodiment of the process according to the invention, the exhaust gas streams arising in the production of prussic acid in a gas-phase process are exhaust gas streams from the BMA—prussic acid from methane and ammonia—process. This process is also known to those skilled in the art and is also described by way of example in Ullmann's Encyclopedia of Industrial Chemistry, sixth Edition, Volume 10, page 194.

Preferably, the process according to the invention is also distinguished in that the exhaust gas streams arising in the production of acrolein in a gas-phase process are exhaust gas streams from the gas-phase oxidation of propylene to acrolein.

Likewise, preferably, the process according to the invention is also distinguished in that the exhaust gas streams arising in the production of acrolein in a gas-phase process are exhaust gas streams from the gas phase partial oxidation of propane to acrolein.

It is particularly preferred that the exhaust gas streams from the production of acrolein and the production of prussic acid occur in good concurrence with respect to time, in such a manner that the advantages of the shared combustion can be comprehensively utilized without a temporary store for the exhaust gas streams being necessary therefor. The process according to the invention is therefore preferably distinguished in that the production of acrolein and the production of prussic acid take place in parallel with respect to time, and therefore the exhaust gas streams from the production of acrolein and the production of prussic acid likewise arise in parallel with respect to time.

For the optimal utilization of the advantages of a shared disposal of the process exhaust gases, erection and operation on a shared location (group location) is particularly preferred. The process according to the invention is therefore preferably distinguished in that the production of acrolein and the production of prussic acid take place at one location and therefore the exhaust gas streams from the production of acrolein and the production of prussic acid likewise arise at one location. Transport of the exhaust gas streams is thereby minimized and the exhaust gas streams can be fed directly to the thermal afterburning.

In a very particularly preferred embodiment of the process according to the invention, the exhaust gas streams of the production of acrolein and the production of prussic acid arise in good concurrence with respect to time, i.e. parallel with respect to time and at one location.

Figure 3:
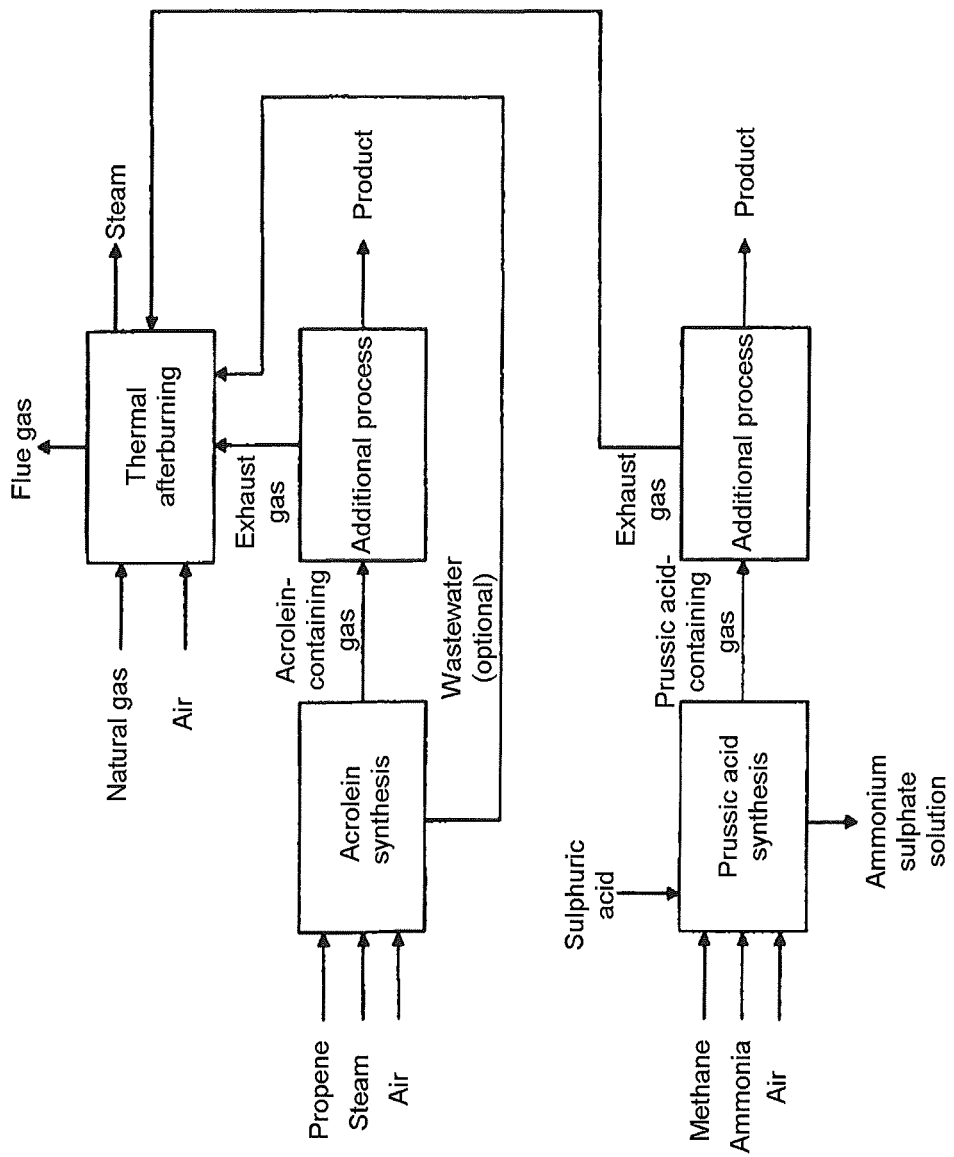
FIG. 3 illustrates schematically acrolein and prussic acid production according to the invention.

In FIG. 3 hereinafter, this particularly preferred embodiment of the process according to the invention is shown schematically.

In FIG. 3, the combustion of wastewater from the production of acrolein is also shown. This is optional. The advantages of the process according to the invention still occur when the wastewater of the acrolein process is disposed of separately from the thermal afterburning, for example in a biological wastewater treatment stage.

Further options relate to the process step designated "Additional process" in FIG. 3. In the context of the invention, it is irrelevant whether this additional process is a classical absorber-desorber unit, in which acrolein or prussic acid is isolated, or whether it is a reactive absorber, in which acrolein or prussic acid can be converted directly into the next intermediate.

In particular, when acrolein and prussic acid are used as precursors for the chemical synthesis of methionine or methionine hydroxy analogue (MHA), the process according to the invention can be used particularly advantageously.

The precursors acrolein and prussic acid are coupled to one another via the end product methionine or methionine hydroxy analogue (MHA). The production of acrolein and the production of prussic acid proceed here in parallel at a shared location, therefore the exhaust gas streams from the production of acrolein and from the production of prussic acid also occur in parallel in time.

In addition, owing to the stoichiometry of the methionine synthesis, quantitative streams for the starting materials acrolein and prussic acid and therefore also exhaust gas streams result which supplement one another expediently with respect to shared thermal afterburning.

The process according to the invention is therefore preferably characterized in that the thermal afterburning is carried out in the context of an integrated process for chemical synthesis of methionine or methionine hydroxy analogue (MHA).

The advantages of the present invention will be described in more detail with reference to the exemplary embodiment hereinafter.

In the production of acrolein (approximately 8 t/h) by gas-phase oxidation of propylene to acrolein, a wastewater stream and exhaust gas stream arise having the following components and amounts:

TABLE 3

Composition and mass flow rate of the exhaust gas and the wastewater from the acrolein synthesis.
Mass flow rate [kg/h]

|  | AC wastewater (optional) | AC exhaust gas |
|---|---|---|
| $O_2$ | 0 | 1850 |
| $N_2$ | 0 | 26988 |
| CO | 0 | 180 |
| $CO_2$ | 0 | 674 |
| $H_2O$ | 5630 | 149 |
| Combustible residue (e.g. propene, acrolein, acrylic acid) | 1335 | 132 |
|  | 6965 | 29974 |

For the thermal afterburning of the exhaust gas stream stated under Table 3, approximately 29 550 $Nm^3/h$ of air and 1929 $Nm^3/h$ of natural gas were required. The resultant heat was utilized for steam production, wherein, at the amounts used, approximately 31 t/h of steam (20 bar) were produced.

In the production of prussic acid (approximately 4 t/h) in a gas-phase process by the Andrussow process, an exhaust gas stream arises having the following components and amounts:

TABLE 4

Composition of the exhaust gas from the production of prussic acid
Mass flow rate [kg/h]

|  | HCN exhaust gas |
|---|---|
| $O_2$ | 152 |
| $N_2$ | 27075 |
| CO | 2120 |
| $CO_2$ | 197 |
| $H_2O$ | 186 |
| Combustible residue (e.g. methane, prussic acid, hydrogen) | 646 |
|  | 30376 |

For the thermal afterburning of the exhaust gas stream stated under Table 4, approximately 27 365 $Nm^3/h$ of air were required. Owing to the thermally utilizable substances present in the exhaust gas stream such as, e.g., methane or hydrogen, an additional feed of natural gas for the thermal afterburning of the exhaust gas from the production of prussic acid was not necessary. The heat produced in the thermal afterburning was utilized for steam production, wherein, at the amounts used, approximately 29.4 t/h of steam (20 bar) could be produced.

The total components and quantitative streams which were fed to the shared afterburning according to the present invention are shown in Table 5.

TABLE 5

Totality of the exhaust gas and wastewater streams fed to the shared thermal afterburning.
Mass flow rate [kg/h]

|  | AC wastewater (optional) | AC exhaust gas | HCN exhaust gas |
|---|---|---|---|
| $O_2$ | 0 | 1850 | 152 |
| $N_2$ | 0 | 26988 | 27075 |
| CO | 0 | 180 | 2120 |

TABLE 5-continued

Totality of the exhaust gas and wastewater
streams fed to the shared thermal afterburning.
Mass flow rate [kg/h]

|  | AC wastewater (optional) | AC exhaust gas | HCN exhaust gas |
|---|---|---|---|
| $CO_2$ | 0 | 674 | 197 |
| $H_2O$ | 5630 | 149 | 186 |
| Combustible residue (e.g. propene, acrolein, acrylic acid, methane, prussic acid, hydrogen) | 1335 | 132 | 646 |
|  | 6965 | 29974 | 30376 |

The thermal afterburning was performed in each case with a residual oxygen content of 3% by volume. The residence time was in each case approximately 2 s. Preheating of the feed gas did not take place. Feed gas is taken to mean all gases which are fed to the thermal afterburning, i.e. not only the process exhaust gases, but also the combustion air and the additional fuel. The combustion temperature was approximately 1130° C. in the case of combustion of the exhaust gas from the production of prussic acid (Tab. 4). In the two other cases (Tab. 3 and Tab. 5), the combustion temperature was accordingly 950° C.

For the shared thermal afterburning of the wastewater and exhaust gas streams stated under Table 5, approximately 46 406 Nm³/h of air were required.

For the separate thermal afterburning, the following amount of combustion air was required:
27 365 Nm³/h+29 550 Nm³/h=56 915 Nm³/h The shared combustion of these two process exhaust gases is proved to enable a reduction of the required combustion air by 18.5%.

For the shared thermal afterburning of the wastewater and exhaust gas streams stated under Table 5, in addition approximately 1158 Nm³/h of natural gas were required.

For the separate thermal afterburning, 1929 Nm³/h of natural gas were required.

The shared combustion of these two process exhaust gases makes possible reduction of the required amount of natural gas by 40%. This corresponds to a saving of approximately 200 $Nm^3_{CH_4}/t_{HCN}$ in the mass flow rates disclosed in the present exemplary embodiment.

The steam production was 51.1 t/h

By means of the process according to the invention, the advantages stated below may be utilized:

1. Scale-up effect owing to the erection and operation of a shared disposal facility, instead of customarily two.
2. Further advantages of the shared combustion of the process gases from acrolein and prussic acid are:
   a. decreased flue gas volumetric stream
   b. decreased size of the disposal facility, in such a manner that the capital cost is reduced beyond the abovementioned scale-up effect
   c. decreased fuel consumption
   d. decreased fan output for the combustion air
   e. decreased $CO_2$ output
   f. avoidance of possibly excess process steam.

The invention claimed is:

1. A process for thermal afterburning, comprising forming an exhaust gas stream in the production of acrolein in a gas-phase process, wherein the exhaust gas stream arising in the production of acrolein in a gas-phase process comprises an exhaust gas stream from a process of gas-phase oxidation of propylene to acrolein, forming an exhaust gas stream in the production of prussic acid in a gas-phase process, wherein the exhaust gas stream arising in the production of prussic acid in a gas-phase process comprises an exhaust gas stream from an Andrussow process or from a BMA—prussic acid from methane and ammonia—process; feeding the exhaust gas stream from the production of acrolein and the exhaust gas stream from the production of prussic acid to a shared thermal afterburning; and burning the exhaust gas stream from the production of acrolein and the exhaust gas stream from the production of prussic acid in the shared thermal afterburning.

2. The process of claim 1, wherein the production of acrolein and the production of prussic acid take place in parallel with respect to time, and the exhaust gas stream from the production of acrolein and the exhaust gas stream from the production of prussic acid arise in parallel with respect to time.

3. The process of claim 1, wherein the production of acrolein and the production of prussic acid take place at one location, and the exhaust gas stream from the production of acrolein and the exhaust gas stream from the production of prussic acid arise at one location.

4. The process of claim 1, wherein the shared thermal afterburning comprises an integrated process for chemical synthesis of methionine or methionine hydroxy analogue (MHA).

* * * * *